United States Patent [19]

Pashkow

[11] 4,273,357
[45] Jun. 16, 1981

[54] VEHICLE SUSPENSION SYSTEM

[75] Inventor: William B. Pashkow, Toledo, Ohio

[73] Assignee: Sheller-Globe Corporation, Toledo, Ohio

[21] Appl. No.: 13,207

[22] Filed: Feb. 21, 1979

[51] Int. Cl.³ .................................................. B60G 11/34
[52] U.S. Cl. .................................. 280/697; 180/73 D
[58] Field of Search .............. 280/688, 697, 698, 699, 280/715, 721; 180/73 R, 73 D, 71

[56] References Cited

U.S. PATENT DOCUMENTS

| 1,982,316 | 11/1934 | Mackenzie | 180/54 F |
|---|---|---|---|
| 2,077,969 | 4/1937 | Tibbetts | 267/11 A |
| 2,084,320 | 6/1937 | Coleman | 280/692 |
| 2,106,874 | 2/1938 | Paton | 180/73 D |
| 2,132,963 | 10/1938 | Nallinger | 280/112 R |
| 2,204,988 | 6/1940 | Haltenberger | 180/73 R |
| 2,367,817 | 1/1945 | Brown | 180/73 |
| 2,381,378 | 8/1945 | Brown | 188/130 |
| 2,531,268 | 11/1950 | Herrington | 180/254 |
| 2,732,903 | 1/1956 | Chayne | 180/73 R |
| 2,741,493 | 4/1956 | Matthias | 280/721 |
| 2,833,366 | 5/1958 | Olley | 180/73 |
| 2,911,052 | 11/1959 | Olley | 180/73 D |
| 2,992,014 | 7/1961 | Müller | 180/73 D X |
| 3,032,153 | 5/1962 | Brown | 52/655 |
| 3,137,923 | 6/1964 | Schalberg | 29/155 R |
| 3,147,815 | 9/1964 | Arkusduntor et al. | 180/73 R |
| 3,356,176 | 12/1967 | Herr | 180/73 R |
| 3,547,215 | 12/1970 | Bird | 180/71 |

FOREIGN PATENT DOCUMENTS

| 236861 | 1/1962 | Austria | 280/697 |
|---|---|---|---|
| 499668 | 3/1951 | Belgium | 280/697 |
| 1505857 | 3/1978 | United Kingdom . | |

Primary Examiner—John J. Love
Assistant Examiner—Norman L. Stack, Jr.
Attorney, Agent, or Firm—Harness, Dickey & Pierce

[57] ABSTRACT

There is disclosed herein a vehicle suspension system suitable for use with both driving and steering wheels comprising a pair of trailing arms pivotably connected at one end to a frame assembly and having the other ends thereof movably supported by the cooperative effort of air springs and a leaf spring extending transversely between the trailing arms. The leaf spring has a center portion secured to the frame assembly so as to provide lateral support to each of the trailing arms as well as to cooperate with the air springs in supporting the frame assembly and associated vehicle body.

17 Claims, 4 Drawing Figures

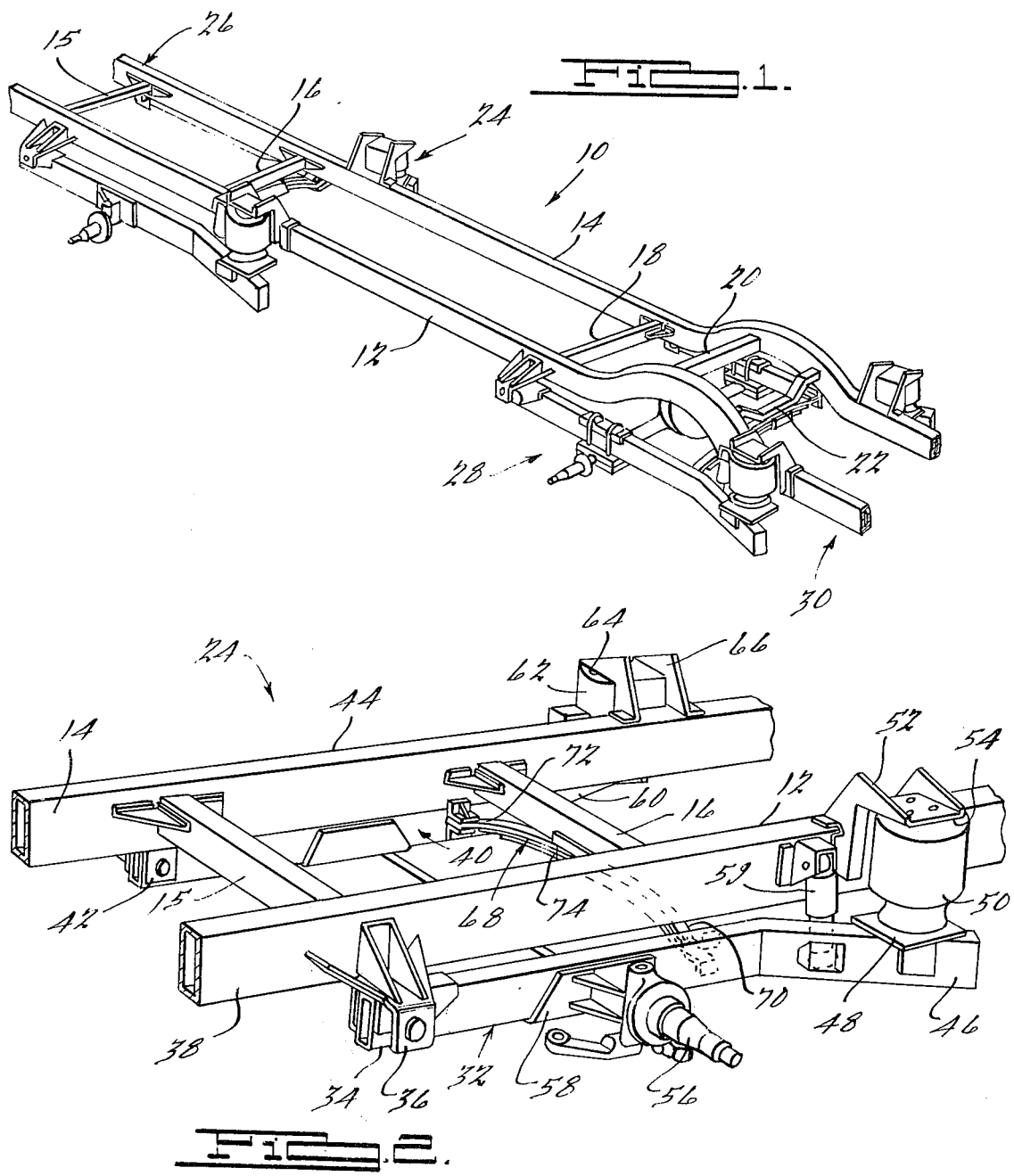

VEHICLE SUSPENSION SYSTEM

BACKGROUND AND SUMMARY OF THE INVENTION

The present invention relates generally to vehicle suspension systems and more particularly to vehicle suspension systems of the trailing arm type in which the arms are supported by the cooperative effort of primary and secondary springs.

Air springs, as often used in suspension systems for commercial vehicles, cnsist essentially of an air inflated bag interposed between the frame and an associated axle carrying member. While air springs are highly desirable particularly in passenger type commercial vehicles due to their ability to provide a smooth ride, they have relatively no lateral stability. Accordingly, such suspension systems have included a wide variety of torque rods, lateral stabilizer bars, bolsters, and other assorted and often times complex control systems. Often these lateral stabilizing arrangements require the use of substantial hardware members below the frame of the vehicle which requires raising the height of the frame so as to assure sufficient room for movement of the hardware members as well as assuring sufficient vehicle ground clearance. Additionally, these complex suspensions result in increased costs both in terms of manufacture and maintenance as well as creating the potential of increased out-of-service time for the vehicle.

There has recently been an increased concern with regard to designing public facilities to accommodate use thereof by the physically handicapped. Such design considerations have been seen through the use of ramps versus steps at building entrances, cut down curbs at cross walks and are now becoming increasingly important in the design of passenger-type commercial vehicles, such as buses or the like. Both ramps and lift platforms have been used in adapting such vehicles so as to enable boarding by the physically handicapped and in particular those individuals who are confined to wheel chairs. While lift platforms are able to accommodate relative large vehicle heights, they are rather complex requiring both substantial space as well as additional equipment. Ramps, however, offer the advantage of simplicity, reduced weight and space economy. However, in order to accommodate the use of a reasonable length ramp without providing an impossibly steep slope, it is necessary to reduce the height of the vehicle floor level to an absolute minimum.

Accordingly, the present invention provides an improved vehicle suspension system which overcomes the above disadvantages of prior suspension systems in providing a relatively uncomplicated suspension system which enables the vehicle floor height to be substantially reduced without sacrificing ride performance or excessively reducing ground clearance. The suspension system of the present invention is designed to be used in conjunction with driving, non-driving and/or steering wheels and comprises a pair of trailing arms pivotably secured to the frame assembly each of which has an air spring operatively associated therewith. A transversely extending leaf spring is also provided extending between the trailing arms and connected thereto with a center portion secured directly to the frame assembly. Both the leaf spring and air springs cooperate to support the vehicle weight with the leaf spring also operating to impart lateral stability to the suspension system. Preferably, both the leaf spring and air springs will each be selected to support their full share of the vehicle weight without assistance from the other spring means thereby enabling the vehicle to be operated in the event one or the other of the spring means is disabled. Also, the use of a transverse leaf spring does not interfere with or reduce ground clearance of the vehicle because it is attached to inner sidewall surfaces of the trailing arms. Thus, the floor height of the vehicle may be reduced to an absolute minimum so as to facilitate adaptation of the vehicle for use by the physically handicapped.

Additional advantages and features of the present invention will become apparent from the following description of the preferred embodiments taken in conjunction with the claims and drawings appended hereto.

BRIEF DESCRIPTION OF THE DRAWINGS

FIG. 1 is a perspective view of a vehicle frame assembly embodying a suspension system in accordance with the present invention;

FIG. 2 is an enlaged perspective view of a portion of the suspension system shown in FIG. 1 illustrating the present invention as applid to the steering wheels of the vehicle;

DESCRIPTION OF THE PREFERRED EMBODIMENTS

Figure 3:
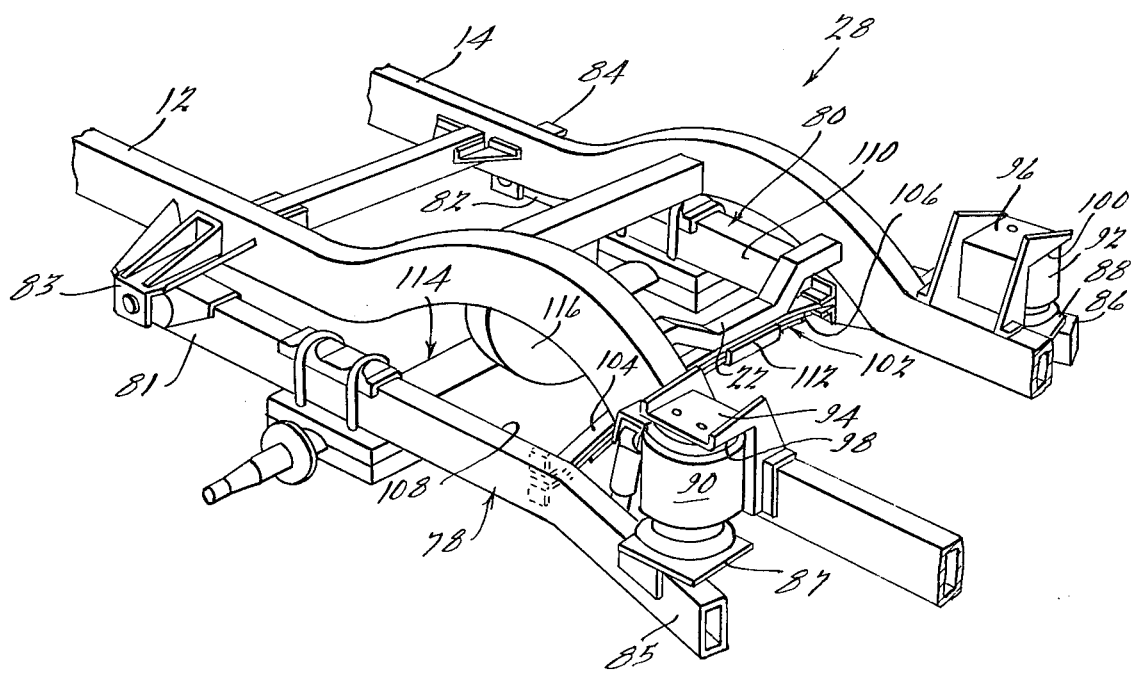
FIG. 3 is an enlarged perspective view of a portion of the suspension system shown in FIG. 1 illustrating the present invention applied to the driving wheels of the vehicle.

Referring now to the drawings and in particular to FIG. 1, there is shown a motor vehicle frame assembly indicated generally at 10 comprising a pair of substantially parallel elongated frame members 12 and 14 interconnected by a plurality of cross members 15, 16, 18, 20, and 22. A first suspension system 24 in accordance with the present invention is provided for the steering wheels on the forward end 26 of frame assembly 10 and a second suspension system 28 is provided for the driving wheels at the rearward end 30 of frame assembly 10.

As best seen with reference to FIG. 2, suspension system 24 comprises a first elongated trailing arm member 32 having a forward end portion 34 pivotably secured to frame member 12 through a torque box 36 secured to the laterally outwardly facing surface 38 of frame member 12. A second trailing arm member 40 is similarly pivotably secured to frame member 14 through a torque box 42 provided on outwardly facing surface 44 of frame member 14. Trailing arms 32 and 40 each extend rearwardly in substantially parallel relationship to and spaced slightly outwardly of respective frame members 12 and 14.

The opposite end portion 46 of trailing arm member 32 is angled outwardly slightly and has a substantially flat generally rectangular platform member 48 secured thereto which forms a lower seat for air spring 50. A generally L-shaped bracket member 52 is secured to frame member 12 and has a downwardly facing surface 54 to which the upper end of air spring 50 is secured.

A wheel spindle 56 is also secured to trailing arm 12 by means of a generally U-shaped bracket assembly 58 and extends outwardly therefrom at a point slightly forward of the midpoint of trailing arm member 14. Also, a conventional shock absorber means 59 is secured to and extends between frame member 12 and trailing arm 32 immediately adjacent to and slightly forward of air spring 50.

The opposite end portion 60 of trailing arm 40 similarly is angled outwardly slightly and has a substantially flat generally rectangular lower platform member provided thereon upon which air spring 62 is seated. The upper end of air spring 62 engages surface 64 of a second generally L-shaped outwardly extending bracket 66 secured to frame member 14. Trailing arm member 40 also has a wheel spindle secured thereto in like manner as described for trailing arm 32.

Suspension system 24 also includes secondary spring means in the form of a transversely extending leaf spring 68 extending between and having respective opposite end portions 70 and 72 secured to trailing arm members 32 and 40 respectively. Leaf spring 68 is comprised of a plurality of separate leafs and has a center portion 74 secured directly to cross member 16 of the frame assembly. Preferably, leaf spring 68 will be a tapered type in which each of the individual leaves decreases in thickness toward the respective opposite ends 70 and 72.

Leaf spring 68 is designed to cooperate with and assist air springs 50 and 62 as well as to provide lateral stability to trailing arms 32 and 40. In a preferred embodiment, leaf spring 68 will support approximately 40% of the load while air springs 50 and 62 will support the remaining 60%.

It should be noted that as end portions 70 and 72 of leaf spring 68 are secured to inwardly facing sidewall portions of respective trailing arms 32 and 40, it does not reduce the vehicle ground clearance at all.

Referring now to FIG. 3, a suspension system 28 in accordance with the present invention is illustrated as applied to the driving or rear wheels of a motor vehicle. Suspension system 28 is similar in construction and operation to suspension system 24 described above comprising a pair of spaced substantially parallel elongated trailing arm members 78 and 80 each having forward ends 81, 82 pivotably secured to respective side rail members 12 and 14 of frame assembly 10 through torque boxes 83 and 84. Also, similarly to that described above, each of trailing arm members 78 and 80 have outwardly angled trailing or rear portions 85 and 86 respectively upon which brackets 87 and 88 are secured which operate to provide a seat for respective air springs 90 and 92. Generally L-shaped brackets 94 and 96 are secured to respective frame members 12 and 14 and have downwardly facing surfaces 98 and 100 respectively which are engaged by the upper ends of air springs 90 and 92. Also, a leaf spring 102 is provided extending transversely between and having opposite end portions 104 and 106 secured to inwardly facing surfaces 108, 110 of respective trailing arm members 78 and 80 and a center portion 112 secured to cross member 22 of frame assembly 10. A driving axle assembly 114 of conventional construction extends between and is secured to each of the trailing arm members, axle assembly 114 having wheel mounting means provided at opposite ends thereof and a centrally disposed differential housing 116.

Similar to that described above with reference to FIG. 2, air springs 90 and 92 will preferably be designed to support approximately 60% of the vehicle weight with leaf spring 102 supporting the remaining 40% as well as operating to provide lateral stability thereby minimizing lateral body float. Preferably leaf spring 102 will be fabricated from a plurality of leaves having a thickness which decreases toward the opposite ends thereof.

In a preferred construction, trailing arms 32, 40, 78, and 80 will each be of a length approximately 36 inches longer than the wheel diameter so as to provide clearance therefor and the respective wheel carrying members will preferably be centered therealong so as to provide equal moment arms for both the respective air springs 50, 62, 90, and 92 and torque boxes 36, 42, 83, and 84. Also, in order to allow use of the smallest possible air springs commensurate with safe design considerations, they will preferably be mounted immediately adjacent the terminal ends of the respective trailing arms. In order to maximize the lateral stabilizing effect, the transverse leaf spring will preferably be secured to the respective trailing arms as close as possible to the point of attachment of the wheel carrying members although slightly behind this point so as to provide clearance for the steering linkage and/or axle assembly.

Figure 4:
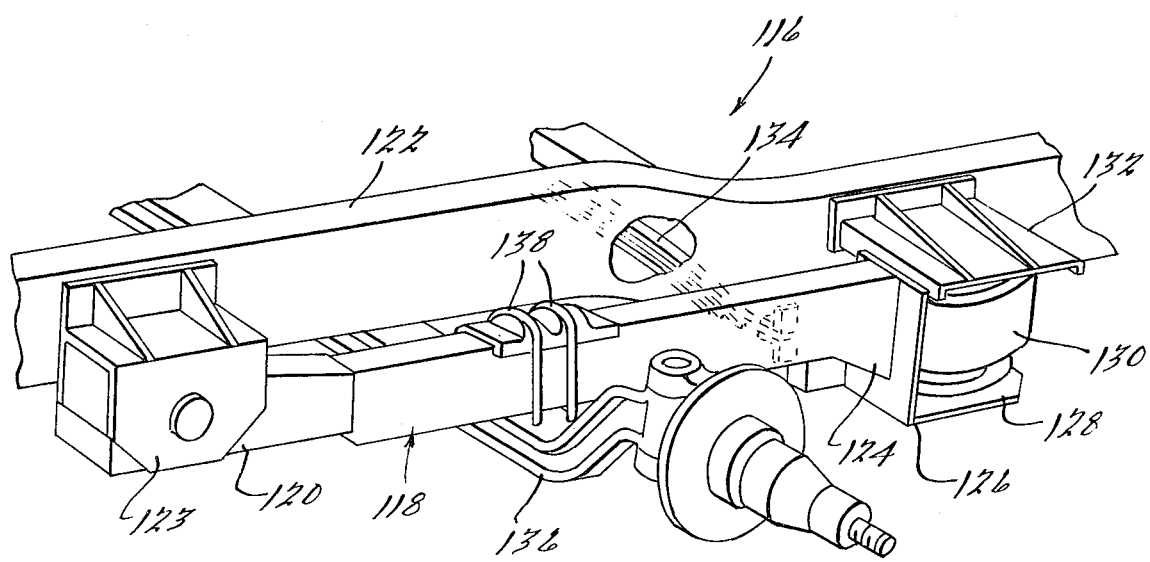
FIG. 4 is an enlarged fragmentary perspective view of another embodiment of the present invention.

Referring now to FIG. 4, another embodiment of the present invention is illustrated being indicated generally at 116. Suspension system 116 comprises an elongated trailing arm member 118 having a forward end 120 secured to an elongated frame member 122 through a torque box 123. The opposite end 124 of trailing arm member 118 has a generally L-shaped bracket member 126 secured thereto which provides a lower surface 128 upon which is mounted an air spring 130. A generally outwardly extending flange member 132 is secured to frame member 122 in overlying relationship to surface 128 so as to form an upper seat for air spring 130. It should be noted that in this embodiment, the lower seat of air spring 130 is not seated on top of trailing arm member 118 but rather slightly below trailing arm member 118. Lateral stability is provided for suspension system 116 by means of a transversely extending leaf spring 134 in the same manner as described above.

As shown, the embodiment of FIG. 4 is adapted for use with a solid transversely extending steering axle 136 carrying a wheel spindle which is secured to trailing arm member 118 by means of conventional U-bolts 138.

The operation and function of suspension system 116 is substantially identical to that described above with the spring weight being preferably distributed 60% to the air spring and 40% to the leaf spring. Also, leaf spring is substantially identical in construction to leaf springs 68 and 102 described above.

It should also be noted that while the suspension system of the present invention has been illustrated and described for use in conjunction with a solid rear driving axle, it is equally applicable to various types of independent suspension systems in which the differential assembly will be secured to the vehicle frame, separate wheel spindle secured to each of the respective trailing arms and drive shafts interconnecting them. Also, as shown, each of the trailing arms, as well as the various components of the frame assembly, are preferably fabricated from fully enclosed box channel members so as to enable maximum strength to be provided with a minimum space and size requirement which also facilitates lowering of the vehicle floor height without reduction of ground clearance.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a vehicle having a suspension system comprising a frame including first and second spaced elongated side rail members and transversey extending interconnecting members secured to said side rail members, an axle assembly, means provided on said axle assembly for securing ground engaging wheels thereto and suspension means for movably mounting said axle assembly to said vehicle frame, said suspension means comprising:

a first trailing arm member having one end pivotably secured to one of said side rails;

a second trailing arm member having one end pivotably secured to the other of said side rails;

means securing said axle assembly to said first and second trailing arms;

first spring means extending transversely relative to said frame and having opposite end portions connected to respective of said first and second trailing arm members, and an intermediate portion secured directly to an intermediate portion directly to said frame, said first spring means being operative to inhibit lateral movement of said frame relative to said axle and to in part resiliently support said frame upon said axle assembly; and a pair of second spring means, one of said pair of second spring means extending between said first trailing arm member and said frame and the other of said second pair of spring means extending between said second trailing arm member and said frame, said second pair of spring means being operative to primarily resiliently support said frame on said axle assembly.

2. A suspension system as set forth in claim 1 wherein said first spring means is selected of a size so as to be able to support said frame on said axle assembly in the event of failure of one or the other of said pair of spring means.

3. A suspension system as set forth in claim 1 wherein said axle assembly is secured to said trailing arms between said one end of said first and said pair of second trailing arms and said first and second spring means.

4. A suspension system as set forth in claim 1 wherein said first spring means is a leaf spring.

5. A suspension system as set forth in claim 1 wherein said pair of second spring means includes a first support member extending from another end of said first trailing arm and one of said side rail members and a second support member extending from another end of said second trailing arm and the other of said side rail members.

6. A suspension system as set forth in claim 5 wherein said first and second support members are air springs.

7. A suspension system as set forth in claim 1 wherein said first and second trailing arms are pivotably secured to opposite laterally outwardly facing surfaces of said first and second side rail members.

8. A suspension system as set forth in claim 7 wherein said first spring means comprises a leaf spring extending transversely between said first and second trailing arms and having opposite end portions connected thereto and said pair of second spring means comprises a first support member extending between said first trailing arm and one of said side rail members and a second support member extending between said second trailing arm and said second side rail member, said first and second support members being positioned laterally outwardly of respective of said first and second side rail members.

9. A suspension system as set forth in claim 8 wherein the weight of said vehicle is unequally distributed between said leaf spring and said first and second support members.

10. A suspension system as set forth in claim 9 wherein said first and second support members support a larger portion of said vehicle weight than said leaf spring.

11. In a vehicle having a suspension system including a frame assembly, rear axle means including means for mounting ground engaging wheels thereon, front axle means including means for mounting ground engaging wheels thereon and suspension means for movably securing said frame assembly to said front and rear axle means in supporting relationship, said suspension means comprising:

a first pair of elongated laterally spaced trailing arm members each having one end pivotably secured to said frame assembly adjacent a forward end thereof;

first leaf spring means extending transversely between said pair of trailing arm members, said first spring means having end portions secured to respective ones of said first pair of trailing arms and an intermediate portion secured to said frame assembly;

a second pair of elongated laterally spaced trailing arm members each having one end pivotably secured to an intermediate portion of said frame assembly;

second leaf spring means extending transversely between said second pair of trailing arms and having end portions secured to respective ones of said second pair of trailing arms and an intermediate portion secured to said frame assembly; and a plurality of air springs, one of said air springs extending between each of said first and second pair of trailing arm members and said frame assembly;

said first and second leaf spring means and said plurality of air springs cooperating to support the weight of said motor vehicle and said first and second leaf spring means being operative to inhibit lateral movement of said first and second pairs of trailing arm members.

12. A suspension system as set forth in claim 11 wherein each of said plurality of air springs are secured adjacent the other ends of each of said first and second pairs of trailing arm members.

13. A suspension system as set forth in claim 12 wherein said first and second spring means are secured to respective of said first and second pairs of trailing arm members immediately adjacent said axle means.

14. A suspension system as set forth in claim 13 wherein said axle means are secured to respective of said first and second pairs of trailing arm members at approximately the longitudinal center thereof.

15. In a vehicle having a suspension system comprising a frame including first and second spaced elongated side rail members and transversely extending interconnecting members secured to said side rail members, axle means including means for securing ground engaging wheels thereto and suspension means for movably mounting said axle means to said frame, said suspension means comprising:

a first elongated trailing arm member having one end pivotably secured to one of said side rail members, a second elongated trailing arm member having one end secured to the other of said side rail members, a first spring means extending between and secured to said frame and the other end of said first trailing arm member, and operative to resiliently bias said other end of said first trailing arm member away from said frame assembly;

a second spring means extending between and secured to said frame and the other end of said second trailing arm member and operative to resiliently bias said other end of said second trailing arm member away from said frame assembly;

said axle means being secured to each of said first and second trailing arm members approximately centrally along the length thereof whereby the moment arm acting on the pivotal attachment of said one end and the moment arm acting on respective of said first and second spring means at the other end of respective of said first and second trailing arms is substantially equal;

third spring means for inhibiting lateral movement of said first and second trailing arm members relative to said frame and in part resiliently supporting said frame on said axle means, said third spring means extending transversely of said frame and having opposite ends secured to respective of said first and second trailing arm members immediately adjacent said axle means and a central portion fixedly secured to one of said interconnecting members of said frame whereby a maximum lateral stabilizing effect is provided to respective of said first and second trailing arm members by said third spring means.

16. A suspension system as set forth in claim 15 wherein said first and second spring means are air springs.

17. A suspension system as set forth in claim 16 wherein said third spring means is an elongated leaf spring.

* * * * *

UNITED STATES PATENT AND TRADEMARK OFFICE
CERTIFICATE OF CORRECTION

PATENT NO. : 4,273,357

DATED : June 16, 1981

INVENTOR(S) : William B. Pashkow

It is certified that error appears in the above—identified patent and that said Letters Patent is hereby corrected as shown below:

Col. 1, line 12, "cosist" should be --consist--.

Col. 2, line 20, "enlaged" should be --enlarged--.

Col. 2, line 23, "applid" should be --applied--.

Col. 5, line 6, (Claim 1) "transversey" should be --transversely--.

Col. 5, line 12, (Claim 1) "trailling" should be --trailing--.

Col. 5, line 22, (Claim 1) delete "an intermediate portion directly to".

Col. 5, line 39, (Claim 2) after "said" insert --second--.

Signed and Sealed this

Twenty-seventh Day of October 1981

[SEAL]

Attest:

GERALD J. MOSSINGHOFF

Attesting Officer     Commissioner of Patents and Trademarks